United States Patent [19]

Fordham

[11] Patent Number: 5,210,531
[45] Date of Patent: May 11, 1993

[54] MONITORING AND CONTROL SYSTEM WITH BINARY ADDRESSING

[76] Inventor: Richard J. Fordham, 1201 Tennyson Dr. #79, Deming, N. Mex. 88030

[21] Appl. No.: 487,139

[22] Filed: Mar. 2, 1991

[51] Int. Cl.$^5$ ............................................. H04Q 1/00
[52] U.S. Cl. ..................... 340/825.59; 340/825.08; 340/825.52; 340/825.43
[58] Field of Search .................. 340/825.08, 825.03, 340/825.04, 825.52, 825.43, 829.59; 364/200, 900; 370/95.2

[56] References Cited

U.S. PATENT DOCUMENTS

| | | | |
|---|---|---|---|
| 2,972,137 | 2/1961 | Dunn | 307/460 |
| 3,345,624 | 10/1967 | Brown | 340/825.52 X |
| 3,382,322 | 5/1968 | Duerden et al. | 340/825.52 X |
| 3,735,106 | 5/1973 | Hollaway | 340/825.52 X |
| 4,100,533 | 7/1978 | Napolizano et al. | 340/825.08 X |
| 4,466,001 | 8/1984 | Moore et al. | 340/825.08 |
| 4,626,846 | 12/1986 | Parker et al. | |

OTHER PUBLICATIONS

"Radio Shack, Dictionary of Electronics", R. Graf, 1972, pp. 436, 437.

Primary Examiner—Donald J. Yusko
Assistant Examiner—Brian Zimmerman
Attorney, Agent, or Firm—Roger M. Rickert

[57] ABSTRACT

A network of addressable modules is disclosed with each module being addressable by a particular multi-digit binary code and each having first and second normally high address input lines which go low only when all the address code digital positions corresponding to the low digital positions in the particular module address are also low. The first address line may be rendered nonconducting and the second rendered conducting when those lines go low. Each module includes a third normally high address input line which goes low in the event any of the address code digital positions corresponding to the high digital positions in the particular module address are low. This third address lines rendered conducting when those lines go low. The modules are preprogrammable to respond to a particular multi-digit binary address and have a programmable address circuit including a plurality of programming groups, one for each digital position in a multi-bit address code. Each programming group includes a number of diodes and another number of single-pole, single-throw switches the particular states of which define the address of the particular module. The switches may take the form of a printed circuit trace which may be selectively severed to determine the status of the switch. The number of single-pole, single-throw switches may be three and the number of diodes two. In this case, two of the three single-pole, single-throw switches are operable together to be either both open or both closed and may be implemented by the equivalent double-pole, single throw switch. Each module is capable of responding to or initiating response by another module of like address.

24 Claims, 3 Drawing Sheets

MONITORING AND CONTROL SYSTEM WITH BINARY ADDRESSING

SUMMARY OF THE INVENTION

The present invention relates generally to addressing schemes for individual units in a network of such units, to the particular unit and a control action initiated by that unit when so addressed, and more particularly to such addressing schemes, units and control actions where a measure of redundancy enhances the reliability of unit selection.

The use of a particular code or address to activate one of a multitude of units connected to a communications link is notoriously widespread as is the use of such codes to interconnect certain selected units from among a larger number of such units. From the humble electric garage door opener, to telephone, teletype and similar communications systems, various control or alarm systems, and the identification of certain input/output units or internal storage locations in a digital computer, the list is almost endless. Some of these systems employ error checking or error correcting techniques, for example, the simple use of a parity or check bit is common in many digital computer systems. As the reliability of the error checking approach increases, generally also does the cost and complexity of the system.

Many of the above noted systems have some scheme for preventing an address decoder from selecting several lines at the same time or for insuring that all unaddressed stations in the system are prevented from effectively receiving the information intended expressly for the addressed station. Frequently they employ a diode decoder addressing scheme with some sort of incorrect selection prevention circuit. For example, the Reenstra et al U.S. Pat. No. 2,946,043 patent discloses a system where all but one of the output channels can be disabled, thus effecting selection of a single channel. The Kaufman U.S. Pat. No. 3,679,911 is also concerned with selecting one circuit while locking out all the others.

Some of these known devices receive and transmit data serially while operating internally in a parallel mode while others receive and transmit data in parallel (multiple channels or conductors) and may operate internally either in parallel or a series mode. The particular binary code used in transmission may differ from the internal operating code. In any case, some form of code converter, e.g., serial/parallel or from one binary code to another, is frequently employed.

Diode matrices are commonplace in code converters, e.g., binary or binary coded decimal to one-out-of-n code. For Example, the Potter et al U.S. Pat. No. 3,226,685 patent shows the use of diode matrices to convert between a selected binary code and a one-out-of-n code.

Finally, the equivalence of switches and optional umpers or printed circuit board traces to be cut may be inferred by their use interchangably on garage door openers as well as on personal computer add-on boards to define a particular output line.

Despite the above noted prior knowledge, there remains a need for device addressing schemes which are easily and economically implemented and which are relatively immune to false responses. This need is met by the present invention by employing a combination of a diode matrix with selected switch or equivalent settings to achieve a positive addressing of selected ones of the modules or units by signals which match the particular switch settings on one line along with the lock-out or disabling of the addressing of a unit based on an improper signal on another line.

Among the several objects of the present invention may be noted the provision of an addressable module which initiates a control action upon being selected; the provision of a relatively error free method of addressing a remote device; the provision of an addressing scheme characterized by the ease and economy with which it is implemented and which is relatively impervious to false positive responses; the provision of an addressing scheme where all lines of an address bus are held high until one or more are driven to a low voltage during the addressing process; the provision of a unique and simplistic technique for preprogramming a module to respond only to a specified binary code; the provision of an addressable module having a unique address defined by a series of switch positions and associated oppositely poled diodes; the provision of an addressable module in accordance with the previous object wherein the switches comprise selectively severed printed circuit traces; the provision of a module generally in accordance with any of the previous objects which is capable of either addressing or being addressed by another module; and the achievement of an overall reduction in the complexity and enhancement in the reliability of addressing systems generally. These as well as other objects and advantageous features of the present invention will be in part apparent and in part pointed out hereafter.

In general, a method is taught for preprogramming a module having three address input leads so that the module will respond to a unique one only of a set of possible multi-bit binary signals where each binary digit corresponds to one of a high voltage level and a low voltage level. The method includes effecting exactly one of two provisions for connections for each of the individual bit positions of the multi-bit signal. The connection of a selected one of the two voltage levels to one of the three address input leads with a first asymmetrical polarity and to a second of the address input leads with a second and opposite asymmetrical polarity is provided for or, in the alternative, the connection of selected one of two the voltage levels to the third address input lead only with one of the first and second polarity may be provided for. Typically, the module has exactly three input lines, with the one asymmetrical polarity being such as to conduct conventional positive current to the module so long as the module is not addressed and the opposite asymmetrical poling being such as to prevent the flow of conventional positive current from the module so long as the module is not addressed. The third address lead is connected to a selected one of the two voltage levels with the second poling.

Also in general, the present invention contemplates an addressable module as well as a network of such addressable modules each addressable by or capable of addressing other modules with a particular multi-digit binary code and each having first and second normally high address input leads which go low only when all the address code digital positions corresponding to the low digital positions in the particular module address are also low. Each module may also include a third normally high address input lead which goes low in the event any of the address code digital positions corresponding to the high digital positions in the particular module address are low. The first address input lead is rendered nonconducting and the second and third address leads are rendered conducting when those lines go low and each module is addressed by and responds to lows on the first and second address input leads and a high on the third address input lead. Each module includes a programmable address circuit including a plurality of programming groups, one for each digital position in a multi-bit address code, each programming group including a number of diodes and another number of single-pole, single-throw switches the particular settings of which define the address of the particular module. In a preferred form, the switches are implemented by selectively cuttable traces on a printed circuit board.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
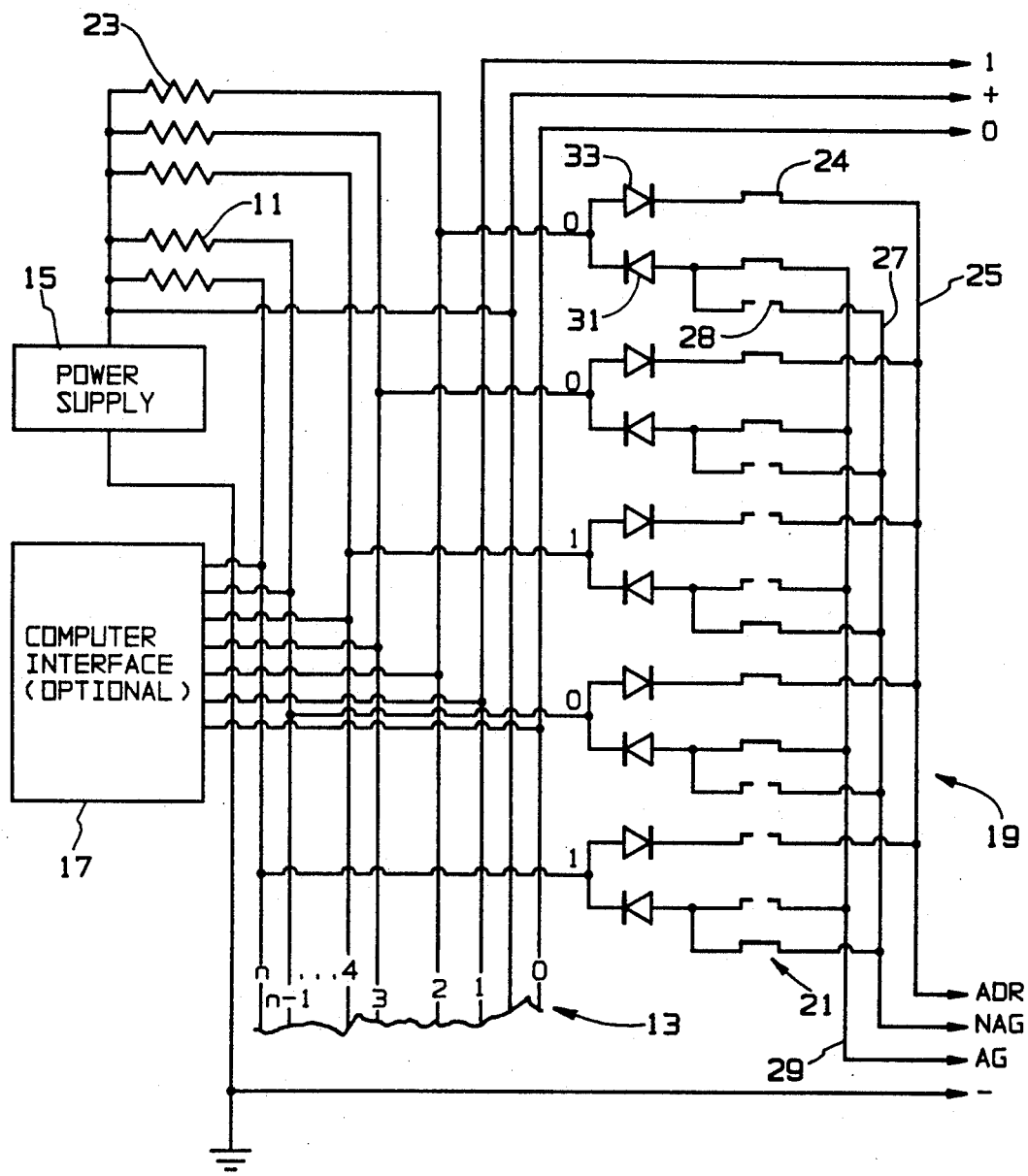
FIG. 1 is a schematic illustration of a communication system for the selective interconnection of selected ones of a set of control modules.

A plurality of transceivers as shown in the illustrative drawings 1 and 2 are interconnected by a multi-line cable 13. A common power supply 15 is connected to the + and − lines to supply power to the individual transceivers and a set of current limiting resistors such as 11 and 23 are connected to the address conductors of the cable. As seen in FIGS. 1 and 3, there may optionally be a central computer 17 connected to the cable 13. As best seen in FIG. 3, each transceiver control module of FIG. 2 has associated therewith a diode matrix 19 of FIG. 1. In greater detail in FIGS. 1 and 2, each transceiver (control section) has associated therewith a diode matrix 19 including diodes such as 31 and 33, and associated switches 21 (programming section) which serves to identify that particular transceiver depending on the status of each of several switches 21. These switches define the binary code or address of a given transceiver with each switch group determining a single bit of the address. Once the switches have been set, the particular module will respond, i.e., be addressed, only by that exact same pattern of voltage level inputs on the respective lines. Single-pole, single-throw switches are shown, but other equivalent switches may be used. Circuit board traces or jumper wires may be used instead of a switch, with one of those wires cut to define one of the "switch" positions or the other two being cut to define the other switch position.

The address lines are labeled 0, 1, 2, . . . n for convenience. In the version of the invention depicted in FIG. 1, n=6, but may be as large as necessary to accommodate the required number of different addresses. The 0 and 1 lines float in the sense that they are not connected by one of the resistors such as 11 or 23 to the power supply 15 and are used for special control functions. This leaves n−1 lines (5 in the illustrated example) which are actually used for addressing. These lines are normally all high and this binary combination (all ones) is not the address of any module. Moreover, the all digital positions low address is reserved for cable supervision purposes. Thus, $2^{n-1}-2$ different addresses are available for use.

Figure 2:
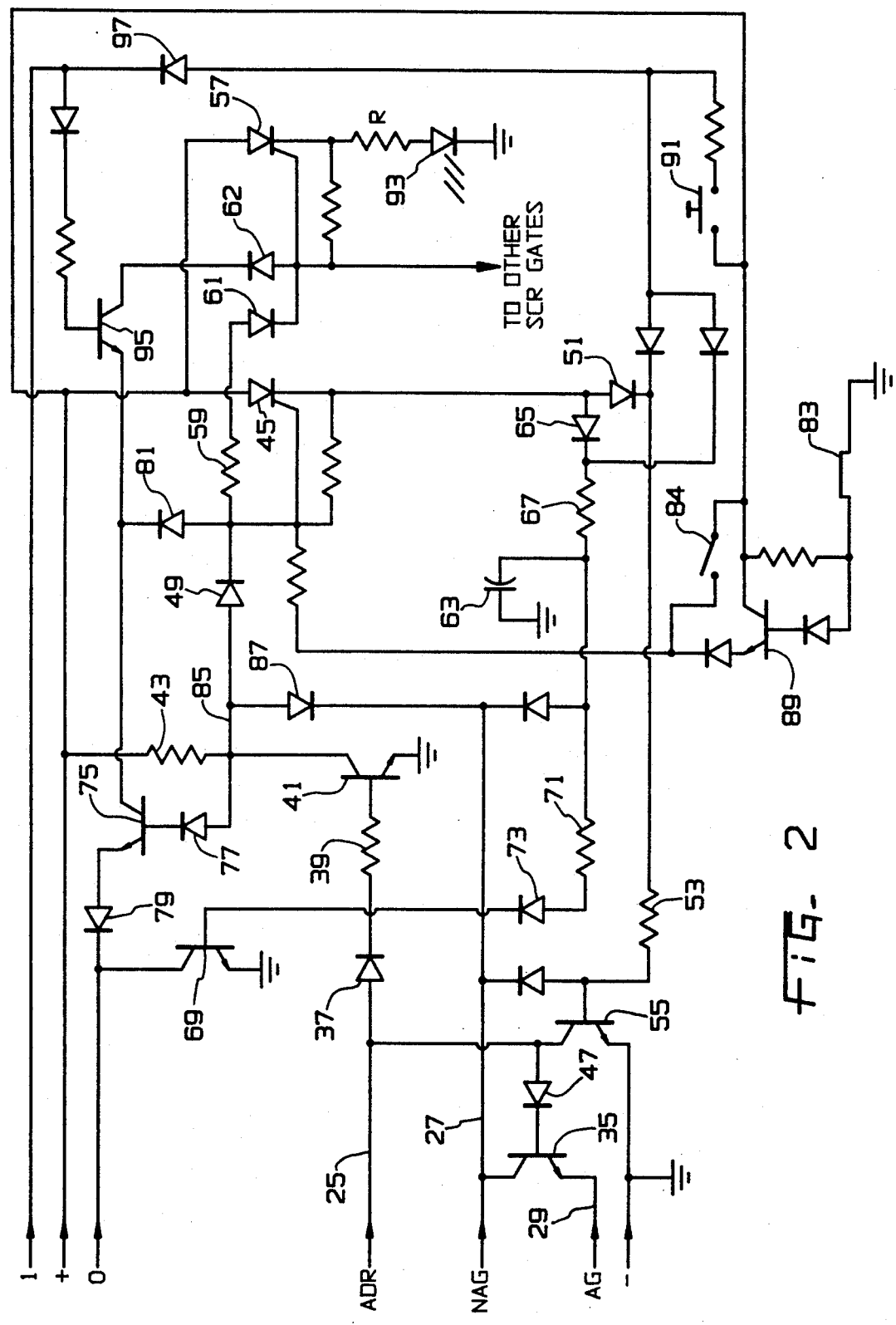
FIG. 2 is a detailed schematic diagram of an illustrative control module.
Figure 3:
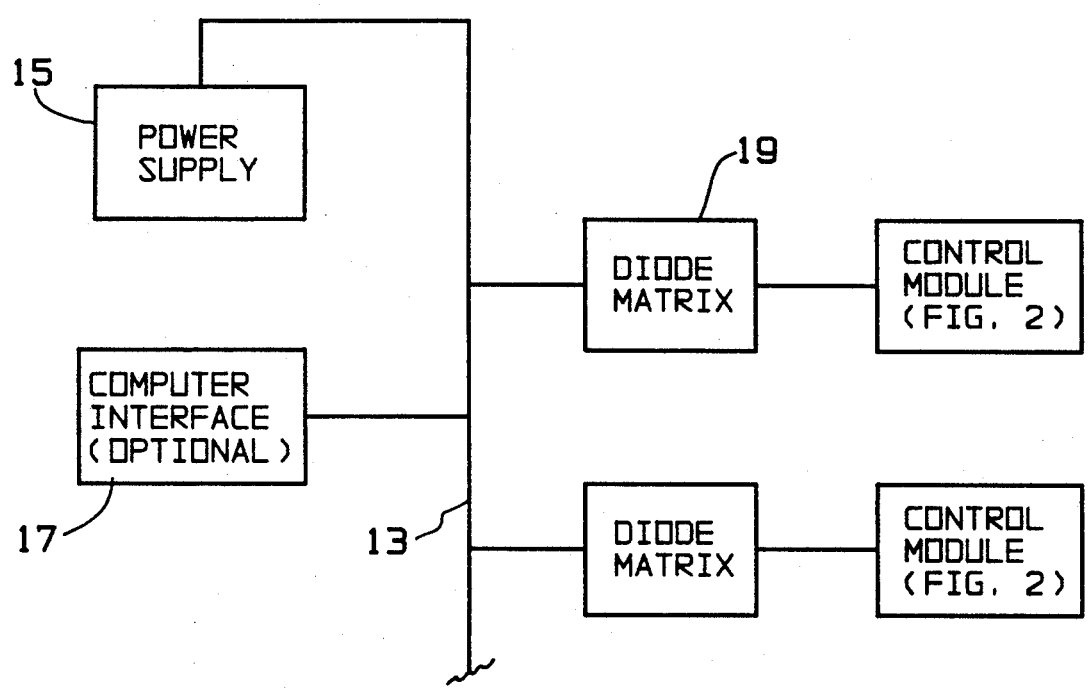
FIG. 3 is a simplified block diagram of the system of FIGS. 1 and 2.

FIG. 2 illustrates the control section of an addressable module which is preprogrammable to respond to a particular multi-digit binary address as determined by the programmable address circuit portion of FIG. 1 and in particular, the status of the switches in each of the plurality of programming groups, one for each digital position in a multi-bit (five in the illustrated example) address code. Each programming group (there is one group for each transceiver module) includes a number of diodes and another number of single-pole, single-throw switches the particular states of which define the address of the particular module. The programmable address circuit includes first 25 and second 29 normally high address input leads which go low (ground or logical 0) only when all the address digital positions corresponding to the low digital positions in the particular module address are also low. The first address lead 25 is rendered nonconducting and the second 29 is rendered conducting when those leads go low. Each module includes a third normally high address input lead 27 which goes low in the event any of the address code digital positions corresponding to the high digital positions in the particular module address are low. This third address lead 27 is also rendered conducting when any of the address code digital positions corresponding to the high digital positions in the particular module address are low. Thus, each module is addressed by and responds to lows on the first and second address input leads and a high on the third address input lead.

Each single-pole, single-throw switch may comprise a printed circuit trace which may be selectively severed to select the status of the switch. As illustrated in FIG. 1, the number of single-pole, single-throw switches is three and the number of diodes is two. The two single-pole, single-throw switches 24 and 26 are operable together to be either both open or both closed. An address bit in the programming group is set to one by opening 24 and 26 while 28 remains closed and is set to zero by opening 28 while 24 and 26 remain closed. While described as single-pole, single-throw switches for ease of understanding, other switch contact configurations are clearly contemplated by the present invention.

The ADR (address) terminal 25 is normally high (logical 1) and goes low when the module is addressed. The AG (address ground) 29 and NAG (non-addressed ground) 27 leads are also normally high and lead 29 goes low or 0 while 27 remains high under normal addressing of that module. In the quiescent state when no module is being addressed, all the lines are high or logical 1. The address of the particular diode matrix shown is 10100 reading from bottom to top with the zeros occurring on precisely those lines which are jumper or switch connected through oppositely poled diodes to the ADR and AG leads 25 and 29 while the ones occur on those leads which are jumper or switch connected through one of the diodes to the NAG lead 27.

The positive voltage or logical "one" on lead 25 causes a current flow through diode 37 and resistor 39 and the base of transistor 41 holding that transistor in a conducting state and shorting resistor 43 to ground.

Such grounding of resistor 43 prevents the silicon controlled rectifier 45 from triggering. So long as lead 25 is positive, there is also a current flow through diode 47 to render transistor 35 conductive and interconnect the leads 27 and 29. If the module is precisely addressed, the address lead 25 will be low and no base drive will be applied to transistor 41. With transistor 41 nonconducting, current flows through resistor 43 and diode 49 enabling the silicon controlled rectifier 45 to supply base drive to transistor 55 by way of diode 51 and resistor 53. Thus enabled, the transistor 55 would conduct should lead 25 attempt to return to its high voltage, thus, transistor 55 latches the lead 25 to its low level. Conduction by transistor 55 removes base drive from transistor 35 and leads 27 and 29 are no longer connected. When transistor 41 becomes nonconducting turning on silicon controlled rectifier 45, gate current is also supplied to the silicon controlled rectifier (SCR) 57 through resistor 59 and diode 61. Conduction by the silicon controlled rectifier 57 (and any others acting in consort with it) initiates whatever control circuit action the particular module is designed for. The use of a more lengthy address would, of course, allow a module to distinguish between and initiate selected ones of several different control functions.

Current flow in SCR 45 charges capacitor 63 by way of diode 65 and resistor 67. As this charge builds, base drive current is supplied to transistor 69 by way of resistor 71 and diode 73. Transistor 69 turns on shorting the 0 bit control line 75 to ground. It will be recalled that the control unit has been addressed, that lead 25 has gone low and transistor 41 is nonconducting. Under these conditions, transistor 75 is turned on by current flow through diode 77 and the gate of SCR 45 is grounded through diode 81, transistor 75, diode 79 and transistor 69. This momentary grounding of the gate interrupts the cathode to anode current flow in SCR 45 returning it to its nonconducting state. SCR 57, however, remains on since transistor 95 is nonconducting.

A number of SCR's may be connected in parallel for enabling a number of different functions. Each of these (as well as SCR 45) will have a gate input enabling circuit including a diode such as 61 and a gate extinguishing circuit including a diode such as 62. Any one of these current carrying silicon controlled rectifiers may be reset to a nonconducting state preparatory to subsequent triggering by a selectively applied positive gate signal through a diode such as 61 by momentarily grounding the gate by way of a diode such as 62 while the device is conducting to interrupt the anode to cathode current flow through the device. The normal way in which an SCR is turned off is to interrupt the anode to cathode current flow through the SCR. In the present invention this interruption of the current flow is the result of the grounding of the gate, the direct cause of the resetting of the device. Thus, the charging of capacitor 63 provides a slightly delayed automatic reset of the portion of the circuitry which senses addressing of the module which will only take place when that particular module has been correctly addressed. Of course, this automatic reset takes place in each module having the particular address.

The particular address of a module is determined by the pattern of the switches 21. For the module illustrated in FIG. 1, the address (reading from the bottom up) is 10100. When this same pattern of high and low voltages appears on the respective lines, the module will respond or be "addressed." False recognition of or response to an address is prevented by grounding the NAG lead 27. When a module is properly addressed, a zero on an addressed (trace 28 cut and traces 24 and 26 intact) lead grounds the AG lead 29 and removes positive drive from the ADR lead 25. The NAG lead 27 remains ungrounded by a high on the unaddressed (traces 24 and 26 cut and 28 intact) leads. For any improper address, at least one of the following will happen: lead AG is grounded, lead NAG is grounded or lead ADR is high conducting current to the module. A high on ADR lead 25 indicative of a one on one of the leads which should be zero when this particular module is being addressed enables transistor 41 and shunts current from the positive supply directly to ground through resistor 43.

The appearance of zeros on all the appropriate leads, and, therefore, a zero on lead 25, effectively removes base drive from transistor 41 turning it off and turning SCR 45 on an the unit has been successfully addressed when SCR 45 conducts. The presence of an erroneous zero on any line which should be 1 will drag the NAG lead 27 to ground via a diode such as 31. This lowers the voltage on line 85 to ground by way of diode 87 preventing gate current from reaching SCR 45.

The opening of normally closed switch 83 (or equivalently, the closing of the normally open switch 84) will initiate addressing of all other modules of like address when the unit is in the stand-by mode. When this normally closed switch 83 is opened momentarily, the unit is placed in the address command mode, transistor 89 is rendered conductive and supplies a positive turn on signal to the gates of SCR's 45 and 57. This activates all modules programmed with this same address. A moment later, the automatic reset circuit on all the commonly addressed modules resets each of the corresponding SCR's 45, but leaves SCR's 57 and all circuits controlled by these SCR's on. A manual form of reset only rather than this automatic reset may be desired in some cases and is achieved by omitting diode 65, which effectively removes the timing circuit including resistor 67 and capacitor 63 from the circuit, and relying on manual reset by depressing switch 91. When normally open switch 91 is momentarily closed, transistor 95 is enabled by current flow from the positive source via diode 97 and SCR 57 is extinguished. A light emitting diode 93 will be energized so long as current flows through the SCR 57 indicating the circuit has initiated or responded to its unique address.

Thus, SCR's such as 45 and 57 are cutoff or reset to their nonconducting states by the momentary grounding of their respective gates. SCR's are normally reset or cutoff by a relatively expensive high level interrupter device in the load circuit. Remote switching control using low level economical devices is achieved in the present invention by momentary grounding of the gate which brings the P-layer of the SCR to near ground interrupting the current flow through the anode circuit of the device. For the gate to control cutoff, the load should be in the cathode to ground circuit. When the gate is grounded, its voltage is nearer to ground than the SCR cathode due to the presence of the load in the cathode to ground circuit. Moreover, that load should include a semiconductor device. For example, the LED load 93 (a semiconductor device) is in the cathode to ground circuit of SCR 57. If more than one SCR gate is to be controlled from the same source, a semiconductor device should also be in the gate to trigger and in the gate to ground circuit to prevent any interaction between the devices. Again by way of example, diode 61 is in the gate to trigger circuit of SCR 57 and diode 62 is in the gate to ground circuit of that SCR.

From the foregoing, it is now apparent that a novel addressing arrangement and technique has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. The method of preprogramming and addressing a module which has at least three address input leads to respond to a unique one only of a set of possible multi-bit binary signals where each binary digit corresponds to one of a high voltage level and a low voltage level, the method comprising the steps of effecting exactly one of the following two provisions for connections for each of the individual bit positions of the multi-bit signal:

providing for the connection a selected one of the two voltage levels to one of the three address input leads with a first asymmetrical polarity and to a second of the address input leads with a second and opposite asymmetrical polarity; and providing for the connection of a selected one of two the voltage levels to the third address input lead only with one of the first and second polarities.

2. The method of claim 1 wherein the module has exactly three input leads, said one asymmetrical polarity being such as to conduct conventional positive current to the module so long as the module is not addressed and wherein the third address lead is connected to a selected one of the two voltage levels with the second polarity.

3. The method of claim 2 wherein one voltage level is zero volts and the other is a positive voltage, the method including the further step of addressing the preprogrammed module by applying zero volts to said one and second of the three address input leads; and applying the positive voltage to the third address input lead.

4. The method of claim 2 wherein the first address input lead has a positive voltage removed from it, the second address input lead has its potential lowered to zero, and the third address input lead is held above zero volts when the particular module is addressed.

5. A network of addressable modules each addressable by a particular multi-digit binary code and each having first and second normally high address input leads which go low only when all the address code digital positions corresponding to the low digital positions in the particular module address are also low.

6. The network of claim 5 wherein the first address lead is rendered nonconducting and the second is rendered conducting when those leads go low.

7. The network of claim 5 wherein each module includes a third normally high address input lead which goes low in the event any of the address code digital positions corresponding to the high digital positions in the particular module address are low.

8. The network of claim 7 wherein the first address input lead is rendered nonconducting and the second and third address leads are rendered conducting when those leads go low.

9. The network of claim 7 wherein each module is addressed by and responds to lows on the first and second address input leads and a high on the third address input lead.

10. The network of claim 5 wherein each module includes a programmable address circuit including a plurality of programming groups, one for each digital position in a multi-bit address code, each programming group including a number of diodes and another number of single-pole, single-throw switches.

11. The network of claim 10 wherein the diodes are poled to conduct conventional positive current to the module by way of the first address input lead and from the module by way of the second and third address input leads.

12. The network of claim 11 wherein the particular module address is determined by the particular positions of the single-pole, single-throw switches which either connect the first and second, but not the third address input lead to the network; or connect the third, but not the first and second input leads to the network.

13. The network of claim 12 wherein each single-throw, single-throw switch comprises a printed circuit trace which may be selectively severed to determine the status of the switch.

14. The network of claim 12 wherein the number of single-pole, single-throw switches is three and the number of diodes is two.

15. The network of claim 14 wherein two of the three single-pole, single-throw switches are operable together to be either both open or both closed.

16. An addressable module preprogrammable to respond to a particular multi-digit binary address and having a programmable address circuit including a plurality of programming groups, one for each digital position in a multi-bit address code, each programming group including a number of diodes and another number of single-pole, single-throw switches the particular states of which define the address of the particular module.

17. The addressable module of claim 16 wherein each single-throw, single-throw switch comprises a printed circuit trace which may be selectively severed to determine the status of the switch.

18. The addressable module of claim 16 wherein the programmable address circuit includes first and second normally high address input leads which go low only when all the address digital positions corresponding to the low digital positions in the particular module address are also low.

19. The addressable module of claim 18 wherein the first address lead is rendered nonconducting and the second is rendered conducting when those leads go low.

20. The addressable module of claim 18 wherein each module includes a third normally high address input lead which goes low in the event any of the address code digital positions corresponding to the high digital positions in the particular module address are low.

21. The addressable module of claim 20 wherein the first address input lead is rendered nonconducting and the second and third address lead are rendered conducting when those lead go low.

22. The addressable module of claim 21 wherein each module is addressed by and responds to lows on the first and second address input leads and a high on the third address input lead.

23. The addressable module of claim 16 wherein the number of single-pole, single-throw switches is three and the number of diodes is two.

24. The addressable module of claim 23 wherein two of the three single-pole, single-throw switches are operable together to be either both open or both closed.

* * * * *